(12) United States Patent
Lyon et al.

(10) Patent No.: US 7,577,577 B2
(45) Date of Patent: *Aug. 18, 2009

(54) PULL TO CUSTOMER ORDER DEMAND FULFILLMENT SYSTEM AND METHOD

(75) Inventors: David J. Lyon, Austin, TX (US); Tomasz P. Wala, Austin, TX (US); Mark R. Graban, Austin, TX (US); Lee B. Beard, Round Rock, TX (US); Kevin T. Jones, Austin, TX (US); Thomas J. Clark, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 503 days.

This patent is subject to a terminal disclaimer.

(21) Appl. No.: 09/774,396

(22) Filed: Jan. 31, 2001

(65) Prior Publication Data

US 2002/0103690 A1    Aug. 1, 2002

(51) Int. Cl.
*G06F 9/46* (2006.01)
(52) U.S. Cl. .......................................................... 705/8
(58) Field of Classification Search ................ 705/7–9, 705/10
See application file for complete search history.

(56) References Cited

U.S. PATENT DOCUMENTS

| | | | |
|---|---|---|---|
| 4,336,589 A | 6/1982 | Smith et al. | |
| 4,669,047 A | 5/1987 | Chucta | |
| 5,040,123 A | 8/1991 | Barber et al. | |
| 5,193,065 A | 3/1993 | Guerindon et al. | |
| 5,278,750 A * | 1/1994 | Kaneko et al. | 705/8 |
| 5,450,317 A | 9/1995 | Lu et al. | |
| 5,608,621 A | 3/1997 | Caveney et al. | |
| 5,712,989 A | 1/1998 | Johnson et al. | |
| 5,787,000 A * | 7/1998 | Lilly et al. | 700/95 |
| 5,946,663 A | 8/1999 | Tanaka et al. | 705/8 |
| 5,991,732 A | 11/1999 | Moslares | 705/8 |
| 6,105,520 A | 8/2000 | Frazer et al. | 112/117 |
| 6,144,945 A | 11/2000 | Garg et al. | 705/28 |
| 7,346,530 B2 | 3/2008 | Jones et al. | 705/8 |
| 2002/0188499 A1 * | 12/2002 | Jenkins et al. | 705/10 |

OTHER PUBLICATIONS

Layden, John E. "A Rapidly Changing Landscape." Manufacturing Systems, pp. 10A-18A, Mar. 1996.*
"Manugistics Introduces Industry's Only Extended Supply Chain Management Solution." PR Newswire, p. 0114NETU009, Jan. 14, 1997.*
Henry K. Graves, et al., *Inventory Management Method and Apparatus*, Published Aug. 4, 1998, United States Statutory Invention Registration No. H1743.

* cited by examiner

*Primary Examiner*—Susanna M Diaz
(74) *Attorney, Agent, or Firm*—Baker Botts L.L.P.

(57) ABSTRACT

A demand fulfillment system and method that uses customer orders to generate a work schedule and a material delivery schedule for a factory that mass produces items, particularly commodities, built to customer order. The demand fulfillment system enables the manufacturer to operate the factory with minimal in-house inventory of parts and/or raw materials by only scheduling work for which inventory is available. Parts and/or raw materials are requested and delivered to an operation of at least one operation on a manufacturing line in the factory from in-house and external inventory based upon the work scheduled for that operation.

2 Claims, 6 Drawing Sheets

PULL TO CUSTOMER ORDER DEMAND FULFILLMENT SYSTEM AND METHOD

CROSS-REFERENCE TO RELATED APPLICATIONS

This application relates to application Ser. No. 09/774,330, filed on same day herewith on Jan. 31, 2001, issued as U.S. Pat. No. 7,346,530 on Mar. 18, 2008, entitled "Flexible Ordering of Inventory from Material Sources According to Material Requirements for Manufacturing Operations" and naming as inventor Kevin T. Jones, the application being incorporated herein by reference in its entirety.

BACKGROUND OF THE INVENTION

1. Field of the Invention

The present invention relates generally to factory systems and, more particularly, to a pull-to-customer-order demand fulfillment system using customer orders and material replenishment times to schedule manufacturing of build-to-customer-order items and scheduling delivery of materials from in-house and/or external inventories for use in manufacturing the items.

2. Description of the Related Art

Scheduling work in a manufacturing environment is a complex process. Most factories use an automated planning and scheduling system to ensure that customer demand is satisfied in a timely manner with minimum inventory. To achieve this goal, such planning requires that work for each manufacturing line is efficiently scheduled, that the appropriate materials needed to complete each task performed are available when needed on the manufacturing line, and that products are manufactured in the order that the products are needed. To produce a manufacturing schedule, customer orders must be received and analyzed, priorities must be assigned to items to be manufactured, manufacturing resources must be allocated, work must be scheduled, raw materials and/or parts must be obtained and delivered to the manufacturing line, work in progress must be tracked, and variability in availability of raw materials and/or parts must be handled. Many manufacturing facilities plan and manage these many tasks by combining multiple computerized planning and scheduling systems with paper-based management systems.

An example of a widely-used commercially available automated planning and scheduling system is i2 Technologies, Inc.'s Factory Planner and Rhythm Collaboration Planner. The i2 Factory Planner generates work schedules and material requirements schedules using customer-provided inputs of demand and inventory. The i2 Rhythm Collaboration Planner helps organizations to quote and promise order delivery to customers in real-time while obeying customer constraints on lot sizes, number of shipments, and time between shipments. The i2 Rhythm Collaboration Planner helps provide a global view of the entire supply chain from sourcing to delivery. These products handle the complicated scheduling for large, distributed, complex manufacturing environments. However, any automated planning and scheduling system can only produce accurate results if inputs to the system are accurate.

Most businesses schedule manufacturing activities based upon forecasts of demand for products. Work is typically scheduled on a daily or weekly basis to meet demand predicted based on past sales. Inputs to the automated planning and scheduling system are demand forecasts.

To ensure that demand is satisfied, most factories maintain inventories of both parts and/or raw materials. Each type of inventory typically includes stock to accommodate the average usage rate and stock to meet variations in demand. However, maintaining high inventory levels does not necessarily guarantee that the right inventory is available when and where it is needed. A material delivery schedule is needed that delivers material to the manufacturing line prior to the time the material is needed during manufacturing.

Furthermore, due to limited space in most factories and the expense of maintaining warehouses of inventory, it is desirable to maintain only the minimum inventory necessary to meet demand. Some factories operate on a build-to-customer-order model where no product is manufactured unless it has been ordered by a customer. This model enables the factory to operate with minimal inventory of finished products, but does not address the inventories of materials.

In additional to minimizing material inventory, it is also desirable to minimize material handling to ensure that materials are delivered to the right location at the right time.

Problems with scheduling manufacturing activities are exacerbated in a mass production manufacturing environment for commodities that are built to customer orders. The term commodity is used herein to describe a mass-produced unspecialized product. In such an environment, the timeframes for manufacturing and delivery activities may be sub-hourly. Demand forecasts do not reliably predict material needs at this level, and schedules based upon demand forecasts become less and less accurate as time elapses between the time the work is scheduled and the time the work is initiated on the manufacturing line. Nor do demand forecasts respond to variations in material needs resulting from atypical customer orders. Scheduling based upon demand forecasts does not provide the responsiveness to changes in inventory and work schedules needed to ensure that materials are delivered to the right place at the right time.

What is needed is a way to use customer orders to schedule work for mass production of commodities built to customer orders. Material availability and replenishment times should be taken into account when scheduling work. The solution should produce a material delivery schedule for delivery of materials from in-house and/or external inventories to the manufacturing lines before the materials are needed in manufacturing the commodities.

SUMMARY OF THE INVENTION

The present invention provides a demand fulfillment system and method that uses customer orders and material replenishment times to generate a work schedule and a material delivery schedule for a manufacturing line that manufactures items, particularly commodities, built to customer order. The demand fulfillment system enables the manufacturer to operate the factory with minimal in-house inventory of parts and/or raw materials. The demand fulfillment system accomplishes this goal partly by only scheduling work for which inventory is available. Parts and/or raw materials are requested and delivered to an operation of at least one operation on a manufacturing line in the factory from in-house and external inventory based upon the work scheduled for that operation.

In one aspect of the invention, the method includes repeating a series of steps a plurality of times during a manufacturing shift. The series of steps comprise using at least one outstanding customer order to generate a work schedule and a material delivery schedule, where each customer order of the at least one outstanding customer order includes at least one item. Generating the work schedule includes scheduling work to manufacture each item of the at least one item on an operation of at least one operation on a manufacturing line.

Generating the delivery schedule includes scheduling a delivery of material to manufacture each item of the at least one item to the operation. Scheduling the delivery of the material includes scheduling the delivery of the material prior to the time the material is needed according to the work schedule.

The method further includes providing the work schedule to the manufacturing line, substantially immediately after generating the work schedule, for initiating work to mass produce each of the at least one item according to the work schedule. The method also includes providing the material delivery schedule for the delivery of the material to manufacture each item of the at least one item according to the material delivery schedule.

In another aspect of the invention, the method includes using a customer order for an item to determine material to manufacture the item and identifying material to manufacture the item from an available inventory of the material. The method includes adding to a work schedule work to manufacture the item at an operation of at least one operation of a manufacturing line using the identified material. The method further includes adding to a material delivery schedule a delivery of the identified material from the available inventory to the operation. The method also includes providing the work schedule to the manufacturing line for manufacturing the item according to the work schedule and providing the material delivery schedule for delivering the material according to the material delivery schedule.

The invention also includes a computer system, a computer program product, and a signal embodied in a carrier wave for implementing each of the above described methods.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features and advantages made apparent to those skilled in the art by referencing the accompanying drawings.

The use of the same reference symbols in different drawings indicates similar or identical items.

DETAILED DESCRIPTION

Figure 1:
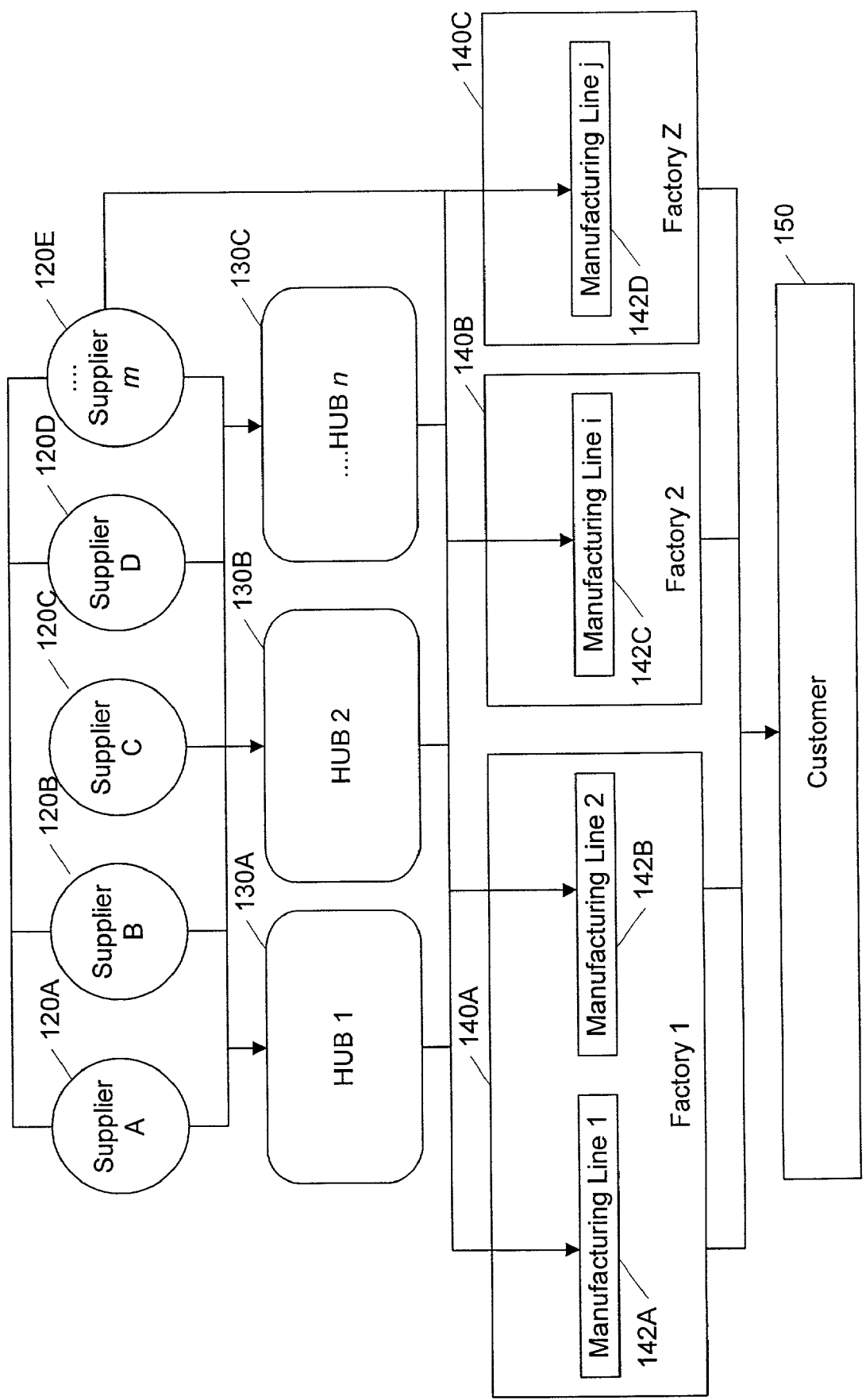
FIG. 1 is a flow diagram showing an example of a supply chain for a manufacturer having several factories.

The following is intended to provide a detailed description of an example of the invention and should not be taken to be limiting of the invention itself. Rather, any number of variations may fall within the scope of the invention which is defined in the claims following the description.

In the demand fulfillment system and method of the present invention, the inefficiencies resulting from using demand forecasts are overcome by using customer orders, material availability, and material replenishment times to plan work schedules and material delivery schedules for multiple operations and/or manufacturing lines of a factory.

In the manufacturing environment described herein, a customer places a customer order for one or more products, such as a computer system. A customer may be an individual or a business entity. The product(s) are built according to the specifications provided by the customer in the customer order and may include one or more components. Generally each component is a commodity that is mass-produced and unspecialized. For example, the customer ordering a computer system product may specify several components such as a processor, monitor, printer, and so on, each of which is mass-produced. The customer order specifies the particular components to be assembled to provide the computer system product.

For simplification purposes, examples used herein may describe a customer order for a single item, wherein an item may represent either a product or a component of a product as described above. The scope of the invention is not so limited, and the invention encompasses the fulfillment of customer orders for multiple products including multiple components. A customer order therefore may include many items and/or multiple quantities of a single item. When a customer order has a single item, as in some examples herein, the assignment of a manufacturing line to fulfill the customer order by manufacturing the item is also an assignment of a manufacturing line to the customer order.

Some items may be manufactured by the manufacturer and other items may be purchased from a supplier but sold as part of a product offered to customers. For instance, the manufacturer of the computer system described above may obtain a monitor from a supplier rather than manufacture the monitor itself.

The term material is used herein to describe raw materials and/or parts used to manufacture an item. For items which are purchased from a supplier and not manufactured in-house, the term material may be used to describe the item itself.

The demand fulfillment system and method of the present invention generates a work schedule for items to be manufactured and a material delivery schedule for materials to be delivered to manufacture the items.

A work schedule includes a time and location for each item to be manufactured. The location may specify a manufacturing line and/or an operation of at least one operation on a manufacturing line to manufacture the item. A material delivery schedule identifies a material, a quantity, a material need-by time, and a delivery location (an operation and/or manufacturing line) for each material required to fulfill the work schedule. The material delivery schedule is used to ensure that materials needed to manufacture the items are delivered to the location they are needed on the manufacturing line prior to the time when manufacturing the item is to begin. The material delivery schedule is developed on a just-in-time basis so that materials are delivered to the manufacturing line just prior to the time that the material is needed for manufacturing the item.

FIG. 1 shows a supply chain for a manufacturer of items according to one embodiment of the invention. Each supplier 120 such as suppliers 120A through 120E supplies parts and/or raw materials, collectively called materials, to the manufacturer. Rather than maintaining a warehouse of materials, the manufacturer obtains materials from at least one external material source. Examples of external material sources include hub 130A, hub 130B, and hub 130C and suppliers 120A through 120E. Each hub is in close proximity to one of the manufacturer's factories, each factory being a factory 140, such as factories 140A, 140B and 140C. Each factory has at least one manufacturing line such as manufacturing lines 142A through 142D. Each manufacturing line may have one or more manufacturing operations (not shown). For factories having multiple manufacturing lines, materials from hubs and suppliers are delivered directly to the operation and/or manufacturing line that needs the material rather than to a general delivery area that serves all operations and/or manufacturing lines for the entire factory.

The term hub is used herein to describe an intermediate business that agrees with the manufacturer to maintain high levels of inventory of materials that can be delivered to the manufacturer's factory on short notice upon request. The hub makes its own arrangements with suppliers to provide material to a storage location for hub inventory. A hub may be referred to as a Supplier Logistics Center (SLC).

Suppliers may also supply parts and/or raw materials directly to the operation and/or manufacturing line upon request. In the context of the present invention, each external material source such as a hub or a supplier has its own inventory data (not shown). The manufacturer has access to the external material sources' inventory data. The manufacturer manufactures the finished products that have been ordered by customers such as customer 150.

Figure 2:
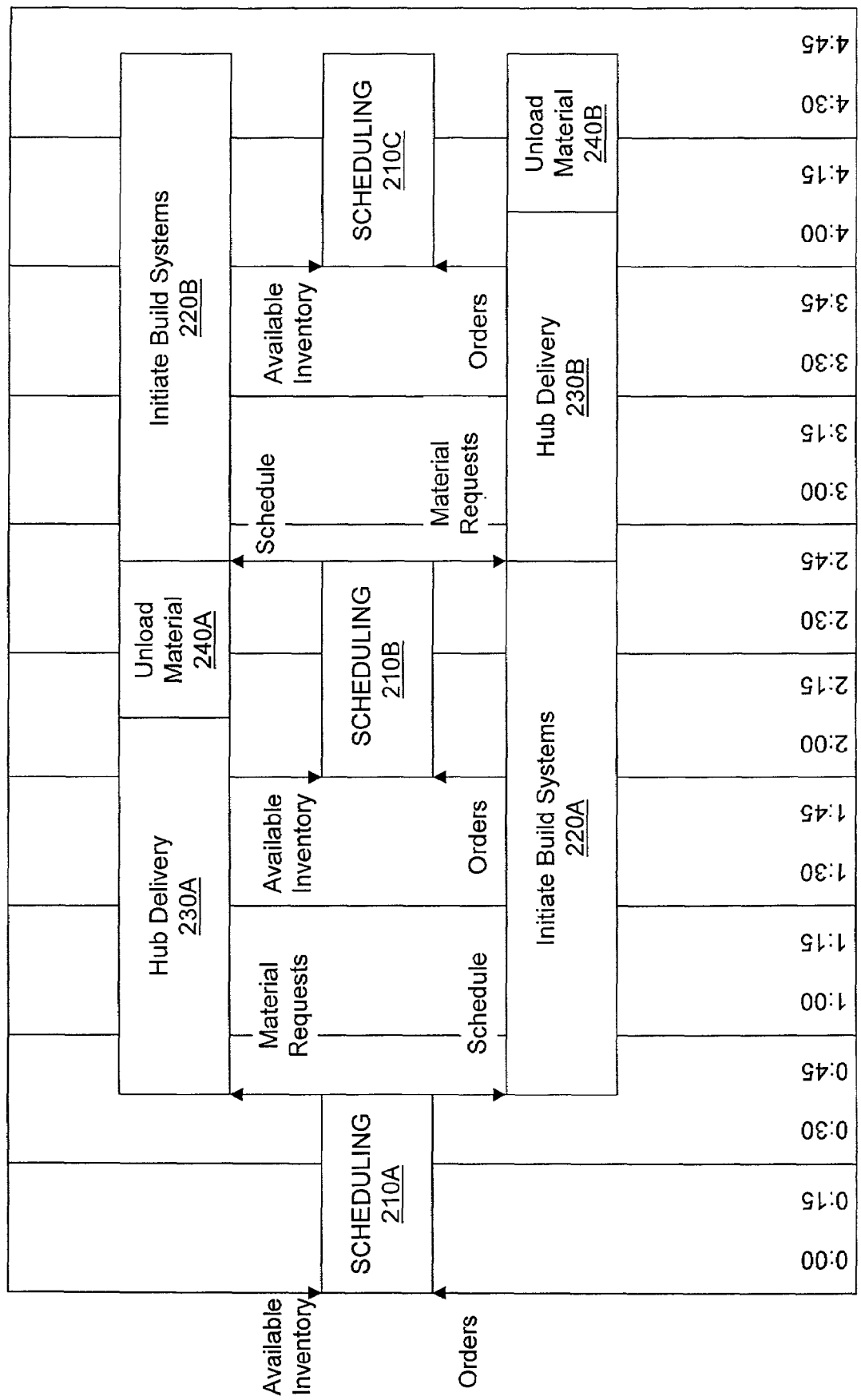
FIG. 2 shows a timeline for scheduling work and delivery of materials for a manufacturing line, receiving deliveries of material from a hub, and initiating work on the manufacturing lines according to the work schedule.

FIG. 2 shows an example of a timeline of activity on a manufacturing line according to the present invention. In this example, work is scheduled every two hours and materials are requested from a hub, an external material source. At time 0:00 shown in FIG. 2, customer orders and available inventory are provided as inputs to schedule work and deliveries of materials to the factory's operations and/or manufacturing lines.

Available inventory includes external inventory as shown in external inventory data, in this case, the hub's inventory data. Available inventory also includes in-house inventory of materials that were requested and delivered from an external material source, but that are not currently allocated to a customer order. While one of the objectives of the present invention is minimize or eliminate the need for an in-house inventory of materials, excess materials may accumulate when work is rescheduled or when excess parts are delivered by an external material source. This in-house inventory may be stored in a storage room at a manufacturing line or in an excess stock storage room.

The timeline shows three examples of scheduling blocks that occur during an example five-hour time period: scheduling block 210A beginning at time 0:00, scheduling block 210B beginning at time 2:00, and scheduling block 210C beginning at time 4:00. For illustration purposes, scheduling block 210A is shown prior to any delivery of material to the manufacturing line. Scheduling blocks 210B and 210C illustrate scheduling after some material has been delivered by hubs to the manufacturing lines. This material from hubs was requested from the hubs during the preceding scheduling block. For example, for scheduling block 210C, available inventory includes in-house inventory of materials that were requested during scheduling block 210B and delivered during hub delivery block 230B. Available inventory also includes materials available from external material sources, as shown in external inventory data.

In the example shown in FIG. 2, each scheduling block allows 45 minutes to generate a schedule. A scheduling block is constrained by the length of time that the scheduling software needs to run. In each scheduling block, such as scheduling block 210A beginning at time 0:00, a schedule is generated for all operations on all manufacturing lines using all outstanding customer orders and all available inventory. A schedule includes a work schedule for work to manufacture items in response to outstanding customer orders and constrained by material availability. A schedule identifies material requirements and may provide a material requirements schedule for materials to be used to perform the work. The work schedule identifies the items to be manufactured and a start time and location (operation and/or manufacturing line) for manufacturing each item.

The customer order identifies the materials that are needed to manufacture the item. A priority scheme may be used to assign inventory to a particular customer order to be built. For example, in one embodiment, unused in-house inventory already at the storage room for the manufacturing line assigned to the customer order receives the highest priority to be used in the next work schedule. In-house inventory stored in an excess stock storage room in the factory is given second highest priority; hub inventory is given third highest priority; and in-house inventory in a storage room for another manufacturing line is given lowest priority. This priority scheme minimizes in-house moves of materials. Other embodiments of the invention may use other methods or other priority schemes to assign materials to customer orders.

A material delivery schedule is developed from the work schedule and the manufacturing requirements so that all materials to be used in manufacturing an item are available at the operation and/or manufacturing line at the time needed for manufacturing the item. The scope of the invention includes staggered delivery of materials to the manufacturing line as items are being manufactured, as long as the material is available at the operation and/or manufacturing line when it is needed.

The present invention allows multiple scheduling blocks to occur during a single manufacturing shift. The term manufacturing shift is used herein to describe a typical manufacturing shift of approximately 8 hours during which mass production of items is continuously performed, although the number of hours in a manufacturing shift may vary. The multiple scheduling blocks produce multiple work schedules and multiple material delivery schedules for a single manufacturing line during each manufacturing shift. Scheduling work and material deliveries multiple times during the shift enables the factory to respond to changing material needs of each manufacturing line on a very short-term basis. Consider the example of FIG. 2 with a scheduling block every two hours. The schedule produced is used to initiate a work schedule after the scheduling block ends and to generate a material delivery schedule for deliveries prior to the next scheduling block, when a new material delivery schedule will be generated.

Replenishment time for material is taken into account when scheduling work. For example, if material that is needed is part of hub inventory, the work schedule must allow for the replenishment time to move the material from the hub inventory to the manufacturing line. Work using that material cannot be scheduled until after the replenishment time has passed. Replenishment time may also be needed for in-house inventory, but it should be shorter than the replenishment time needed for an external material source.

By taking account of replenishment time in scheduling work, the demand fulfillment system ensures that work is not scheduled to begin until all parts and/or materials needed for manufacturing the item are delivered to the operation and/or manufacturing line. Orders are not scheduled that cannot be completed due to missing parts.

At time 0:45, the schedule is provided to the manufacturing line and work included in the work schedule is initiated as shown in Initiate Build Systems block 220A. Also at approximately time 0:45, material requests are made in-house and externally (to the hub in this case) in preparation for the work schedule to begin in two hours. Hub Delivery block 230A and Hub Delivery block 230B show deliveries of materials from the hub in response to material requests at times 0:45 and 2:45, respectively.

The materials delivered prior to the next scheduling block are available as inventory for work to be subsequently scheduled. For example, materials that arrive prior to 2:00 are available as part of in-house inventory for scheduling block 210B. According to the present invention, material is requested so that the material received in response is available at the manufacturing line just in time for manufacturing the item. Material requests are made to ensure that a delivery of material in response to the material request is destined for a single manufacturing line.

Each scheduling block such as scheduling blocks 210A, 210B, and 210C produces another work schedule using all available customer orders and all available inventory. Initiate Build System block 220A shows initiation of the work schedule generated by scheduling block 210A, and Initiate Build System block 220B shows initiation of the work schedule generated by scheduling block 210B.

In the embodiment of the invention illustrated in FIG. 2, the work schedule is generated independently of previously generated work schedules, although other embodiments may update a previously generated work schedule. Often the work schedule generated at a given time, for example at time 0:00 including work scheduled from 2:00 to 4:00, corresponds directly to the work schedule generated two hours later, for example at 2:00, for the work scheduled for the same time period from 2:00 to 4:00. However, changes in customer orders and inventory during the two hours between scheduling may result in differences between the two work schedules.

Unload Material block 240A and Unload Material block 240B show unloading material received from hubs or from in-house inventory at the operation and/or manufacturing line that will use the materials. Unloading materials is expected to occur according to the material delivery schedule just in time for manufacturing the item.

Figure 3:
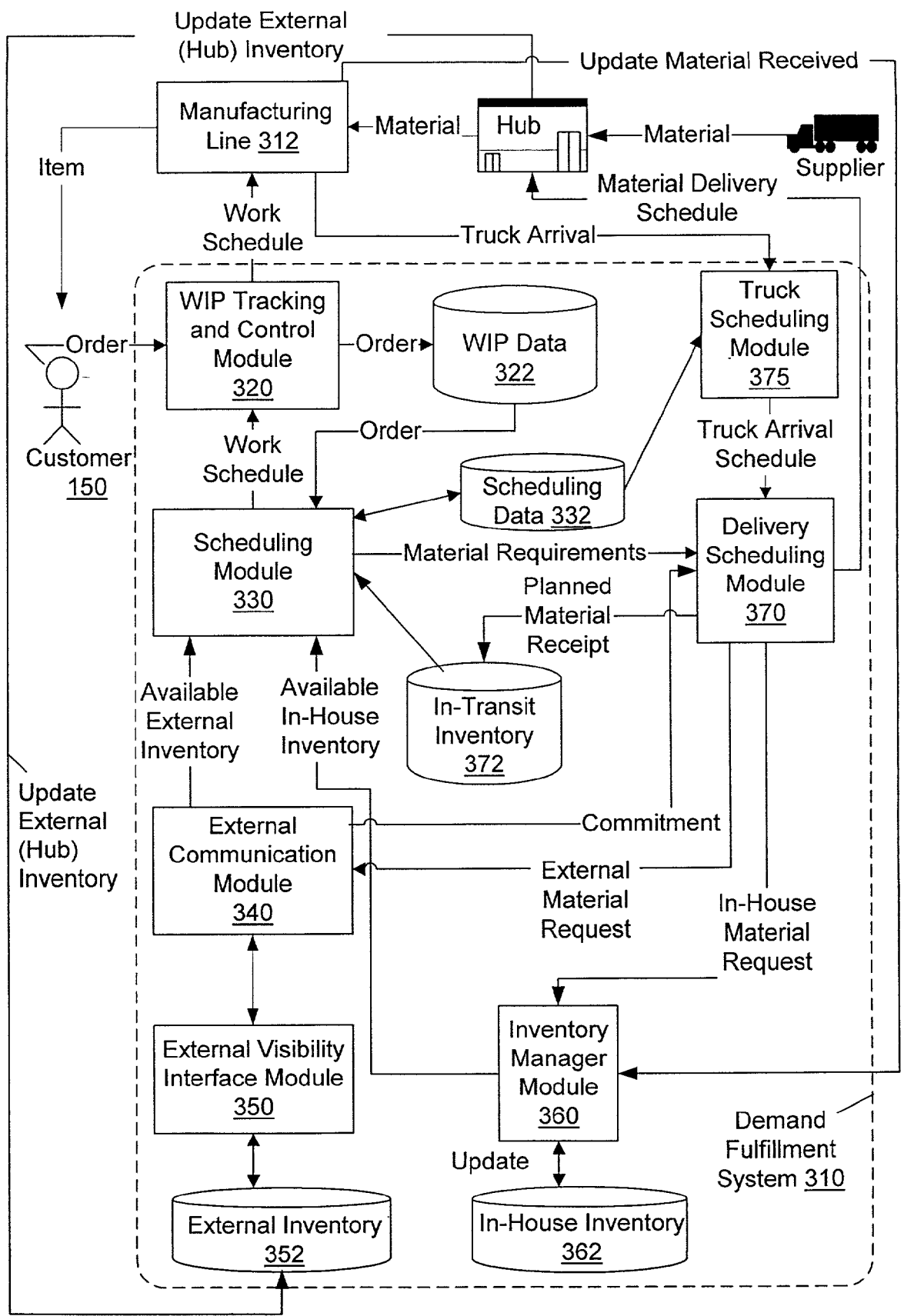
FIG. 3 shows the demand fulfillment system of the present invention and interactions between modules of the demand fulfillment system.

FIG. 3 shows demand fulfillment system 310 and interactions between modules of demand fulfillment system 310. Those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

In some embodiments, the functions of some modules of demand fulfillment system 310 may be provided by commercially available software packages. Other modules may manipulate the inputs and/or outputs as well as provide the necessary interfaces to in-house systems or external systems. For example, inputs are manipulated so that the output of the commercially available software packages is accurately based upon demand derived from customer orders, using materials available from in-house and hub inventory, and with replenishment times taken into account in scheduling work and deliveries of materials. Further manipulation of the output of the commercially available software may be necessary.

For example, in one embodiment, the functions of Scheduling module 330 are provided by i2 Factory Planner and the functions of Hub Communication module 340 are provided by i2 Rhythm Collaboration Planner. The invention is not limited to this embodiment, and the functions performed by each of these modules may be performed by modules specially developed for the demand fulfillment system, by a single module, or by other commercially available software.

In FIG. 3, a hub is used as an example of an external material source. WIP Tracking and Control module 320 controls work in progress (WIP) in the various manufacturing lines of the manufacturer, such as manufacturing line 312. When a customer 150 places a customer order, WIP Tracking and Control module 320 stores the customer order in WIP data 322 which is available to Scheduling module 330.

Scheduling module 330 develops a work schedule using the customer order and various other inputs, as will be described below. Ultimately, Scheduling module 330 provides the work schedule that is used by WIP Tracking and Control module 320 to control the operations performed on the manufacturing lines, such as manufacturing line 312. Scheduling module 330 also provides the material requirements that will be needed to perform the work schedule. Delivery Scheduling module 370 uses the material requirements to develop a material delivery schedule for delivery of materials to the operations and/or manufacturing lines.

Scheduling module 330 also compares the parts and/or raw materials needed to fulfill the customer order with available inventory to determine whether additional materials are needed to manufacture an item of the customer order. Because minimal inventory is maintained at the manufacturing lines, material requests must be issued to move materials to the manufacturing line, both from in-house inventory and from external inventory. Available external inventory and available in-house inventory comprise the available inventory that may be used to fulfill the material request. Scheduling module 330 may use and/or generate schedule data 332 to determine materials to perform certain work; for example, the material replenishment time may be used as part of identifying available inventory to fulfill the customer order.

Delivery Scheduling module 370 determines when a material request should be generated, typically at the last possible moment that will still meet a request deadline. The materials received in response to in-house material requests and external material requests are expected to be in place when the material is needed for manufacturing the item. Delivery Scheduling module 370 generates an in-house material request to Inventory Manager module 360, which manages in-house inventory, and/or an external material request such as a hub material request to External Communication module 340.

When Delivery Scheduling module 370 communicates an in-house material request, Inventory Manager module 360 obtains the available in-house inventory from In-House Inventory data 362. Inventory Manager module 360 communicates the available in-house inventory to Scheduling module 330. Available in-house inventory typically excludes in-house inventory already allocated to another customer order.

External Communication module 340 facilitates communication between the manufacturer and external delivery sources. When Delivery Scheduling module 370 communicates a hub material request, External Communication module 340 determines whether external inventory (here, hub inventory) is sufficient to meet the material request via External Visibility Interface module 350. External Visibility Interface module 350 provides an interface to external inventory data 352, which is data maintained by the external material source (the hub or supplier) rather than by the manufacturer. External Communication module 340 obtains a commitment from the external material source (here, the hub) for the amount of material the hub commits to provide to meet the material request.

External Communication module 340 communicates the available external inventory to Scheduling module 330. If an external material source cannot fulfill the entire material request, the manufacturer is automatically informed of the shortage via the commitment. The manufacturer can coordinate with the external material source to re-stock external inventory to meet demand and/or use another source.

In one embodiment of the invention, the demand fulfillment system and method also tracks in-transit inventory, also shown in FIG. 3 as in-transit inventory 372. In-transit inventory is inventory that has been committed by an external material source but not yet received at the manufacturing line. When a commitment from an external material source is received, Delivery Scheduling Module 370 uses the commitment to update in-transit inventory with a planned material receipt, thereby adding the material to in-transit inventory. In this embodiment, in-transit inventory is considered to be part of the available inventory and is used by Scheduling module 330 for scheduling work. When in-transit inventory is received at the manufacturing line, the material request is "closed" by "zeroing out" the corresponding in-transit inventory and adding the received material to in-house inventory.

Delivery Scheduling module 370 uses the material requirements generated by Scheduling module 330 and a truck arrival schedule to produce a material delivery schedule. The term truck arrival schedule is used herein to describe scheduled deliveries of available inventory to operations and/or manufacturing lines. A truck arrival schedule includes in-house deliveries from in-house inventory and/or deliveries of materials from external material sources. The term truck as used herein describes the transport mechanism used to move material from its storage location to the operation and/or manufacturing line.

A truck arrival schedule is used as input for each generation of a material delivery schedule to allow the factory to quickly adapt to changes in material needs and thus to schedule additional or fewer material deliveries.

When materials are received and/or distributed from in-house inventory, this information is entered into Inventory Manager module 360 and in-house inventory data 362 is updated. The arrival of a truck of materials is also entered into Truck Scheduling module 375, which maintains the truck arrival schedule of trucks scheduled to deliver materials from external inventory and/or in-house inventory.

By using a priority scheme to assign materials to customer orders such as that described above, the demand fulfillment system and method of the present invention are designed to ensure that in-house moves of material are rare and that in-house distribution of materials is performed as efficiently as possible. In addition, material requests are made so that each delivery of material is destined for a single operation and/or manufacturing line.

Figure 4:
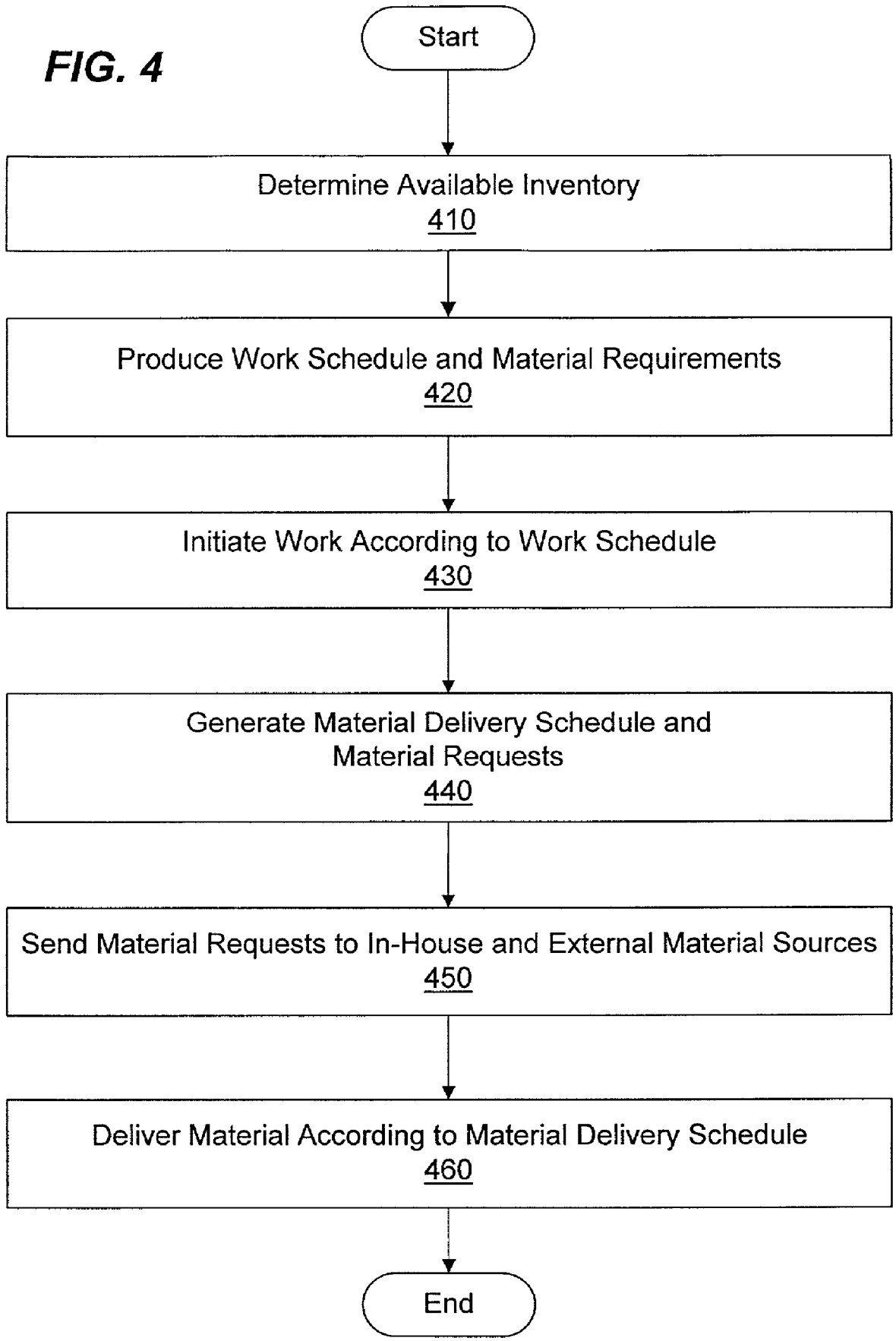
FIG. 4 shows the operation of the demand fulfillment system of FIG. 3.

FIG. 4 is a flowchart showing an overview of the operation of the demand fulfillment system of the present invention. A work schedule and a material delivery schedule are generated using customer orders and available inventory. The term customer order as used herein indicates an outstanding customer order for which manufacturing has not yet begun. Only outstanding customer orders are processed to generate the work schedule and material delivery schedule. The work schedule is used to initiate work on the manufacturing lines and the material delivery schedule is used to deliver materials to the manufacturing lines to perform the work. Although assigning a manufacturing line to a customer order is described herein, the scope of the invention includes using assigning multiple manufacturing lines to manufacture multiple items for a single customer order.

In step 410, the demand fulfillment system determines available inventory from both external material sources and in-house. In embodiments including in-transit inventory, in-transit inventory is considered a part of available inventory. Available in-house inventory typically excludes in-house inventory already assigned to customer orders.

In step 420, a work schedule and material requirements are produced. In the preferred embodiment, customer orders are used to produce the work schedule and material requirements to ensure that the manufacturing of items is responsive to customer demand. When processing of customer orders to produce the work schedule and material requirements is complete, work is initiated according to the work schedule in step 430.

In step 440, a material delivery schedule and material requests are generated. In step 450, the demand fulfillment system sends material requests for materials on the material delivery schedule in-house and to hubs. In step 460, the material is delivered to operations and/or manufacturing lines according to the material delivery schedule.

Figure 5:
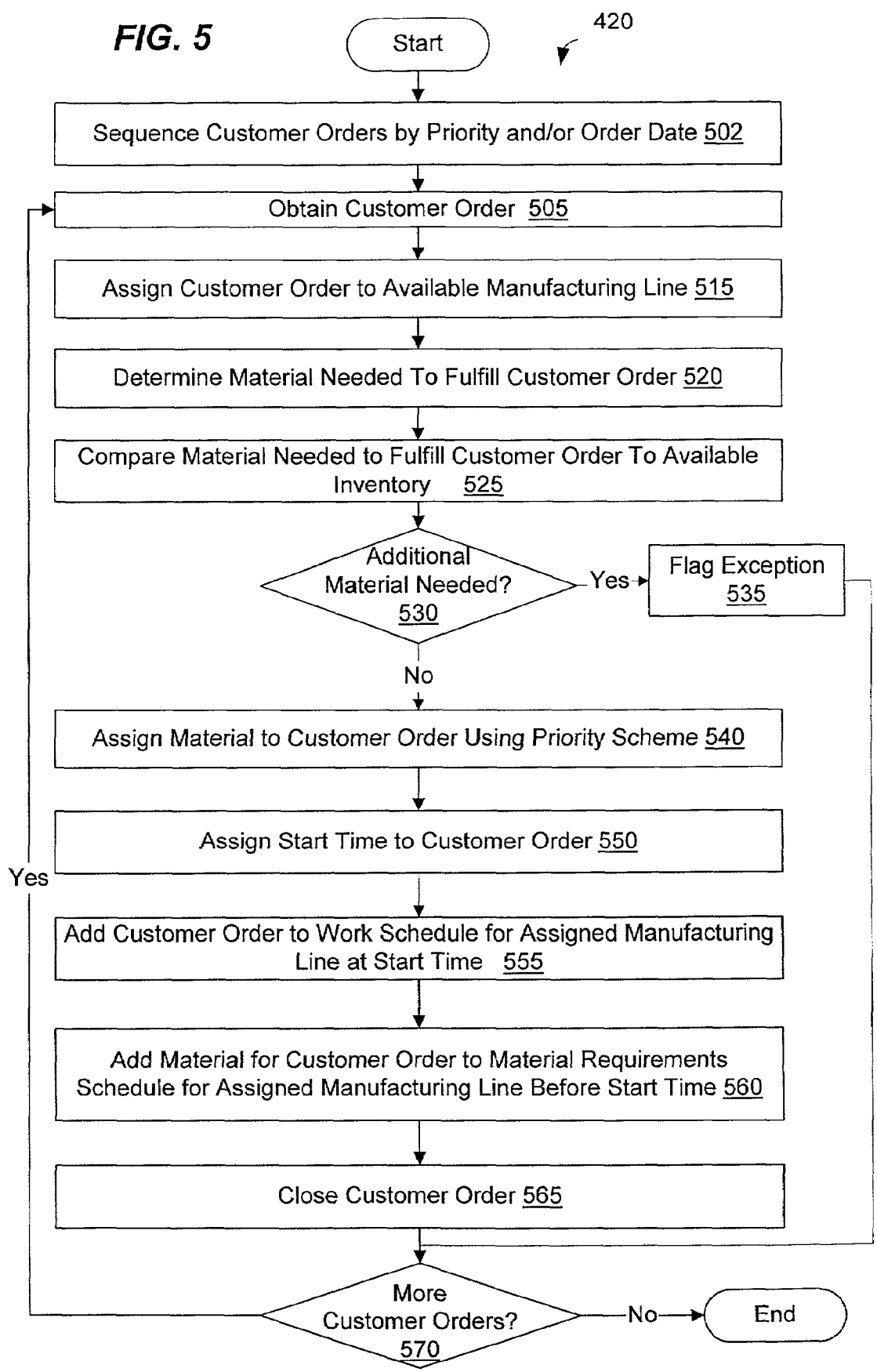
FIG. 5 is a flowchart showing the operation of the Produce Work Schedule and Material Requirements Schedule step of FIG. 4 based upon customer orders.

FIG. 5 is a flowchart showing the operation of the Produce Work Schedule and Material Requirements Schedule step 420 based upon customer orders. Only outstanding customer orders are processed. In step 502, customer orders are placed in order by priority and/or order date. This ordering allows the work schedule to be produced, and therefore customer orders to be filled, according to the time the customer order was placed, the priority of the customer order, or both.

In step 505, a customer order is obtained to be processed in producing the schedules. In step 515, the customer order is assigned to an available manufacturing line. The assignment of a manufacturing line to the customer order may occur at other points later in the processing of the customer order, such as after material requirements are determined, but is shown near the beginning of the processing of the customer order in this example.

In step 520, the customer order is used to determine the material that will be needed. In step 525, the needed material to fulfill the customer order is compared to the available inventory. In step 530, a determination is made whether additional material is needed to fulfill the customer order, indicating that the material is not included in available inventory from external or internal material sources. If no additional material is needed, the customer order can be placed in the work schedule. Control then transitions to step 540.

If additional material is needed in step 530, control transitions to step 535, which shows an optional step of flagging an exception for the customer order. The exception can be used to notify manufacturing personnel and/or computer systems that additional material is needed. Control then continues to step 570.

In step 540, work for the customer order can be scheduled and material is assigned to the customer order using a priority scheme. For example, inventory may be assigned according to a priority scheme similar to the following: first, unused in-house inventory already at the storage room for the manufacturing line is assigned to the customer order; second, in-house inventory stored in an excess stock storage room in the factory; third, hub inventory; and fourth, in-house inventory in a storage room for another manufacturing line.

In step 550, a start time is assigned to begin manufacture of the item for the customer order. Control then transitions to step 555, where the customer order is added to the work schedule for the assigned manufacturing line at the start time. Control transitions to step 560, where the material for the customer order is added to the material requirements for the assigned manufacturing line before the start time. In step 565, the processing of the customer order ends. If the customer order was added to the work schedule, the customer order is closed. If the customer order was not added to the work schedule and steps 540 through 565 were bypassed, the customer order remains outstanding to be scheduled during future scheduling blocks.

In step 570, a determination is made whether additional customer orders exist. If so, control returns to step 505 where processing the next customer order begins. If not, processing of customer orders is completed and control returns to begin the Initiate Work According to Work Schedule step 430 of FIG. 4.

Figure 6:
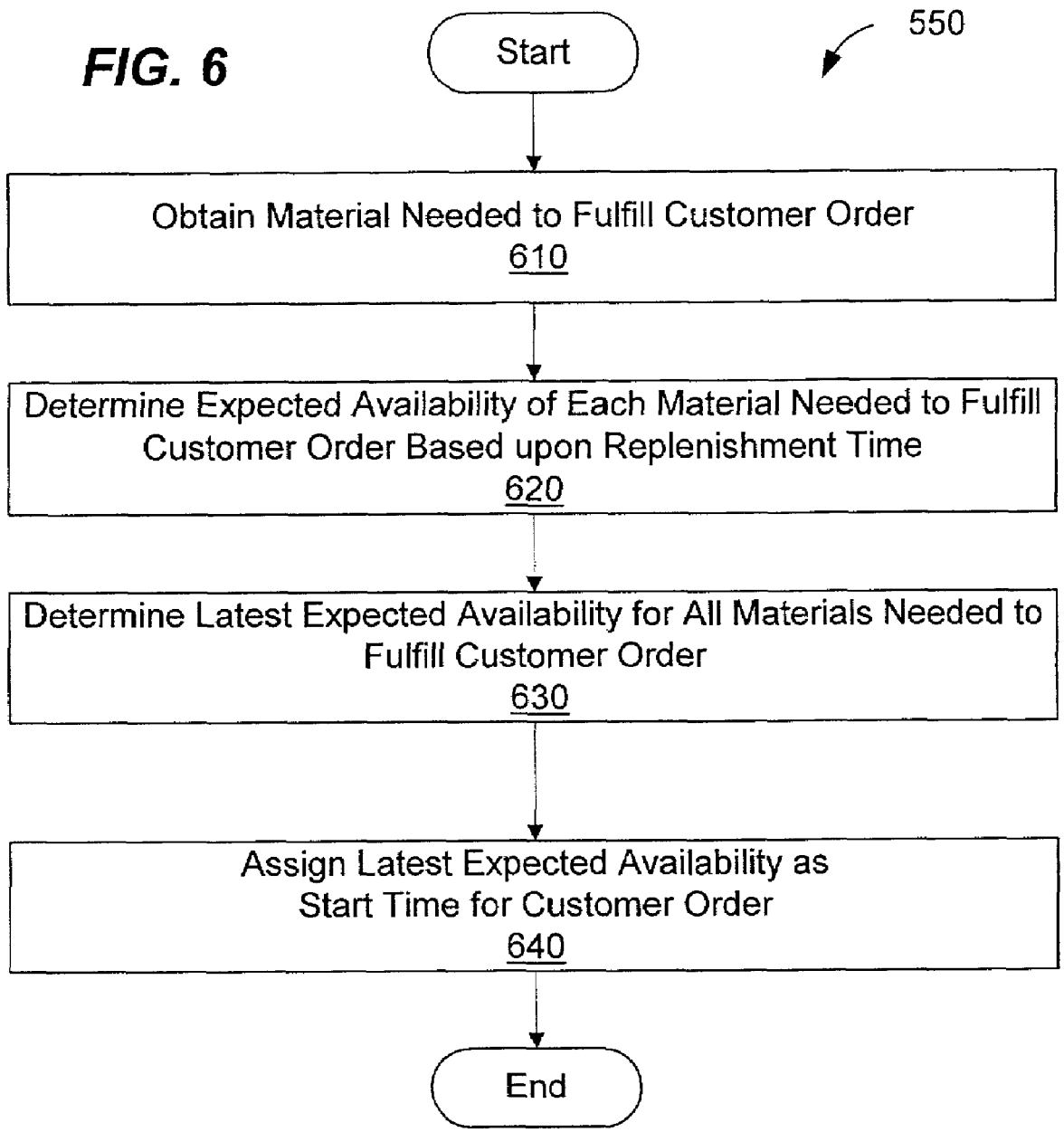
FIG. 6 is a flowchart showing the operation of the Assign Start Time to Customer Order step of FIG. 5.

FIG. 6 shows the operation of the Assign Start Time to Customer Order step 550. In step 610, the materials needed to fulfill the customer order are obtained. In step 620, the expected availability of each needed material to fulfill the customer order is determined based upon its replenishment time. In step 630, the latest expected availability for all materials needed to fulfill the customer order is determined. In step 640, the latest expected availability is assigned as the start time for manufacturing the item of the customer order in the work schedule.

An advantage of the present invention is that in-house inventory generally will only accumulate when last-minute changes to the work schedule are made and material is unused, or when excess materials are received. For example, the manufacturer may agree with the supplier that the number of parts supplied may be the next "round number" of parts in a box or pallet. When 19 parts are requested, the supplier may provide a box of 25 parts. The excess 6 parts will be included as part of in-house inventory until they are used.

Another advantage of the invention is that it enables the factory to initiate more than one work schedule/build cycle and material delivery schedule during a given time period, such as during a manufacturing shift, without the need to maintain substantial in-house inventory of parts and/or raw materials. Manufacturing and delivery of materials are scheduled in response to customer demand rather than driven by a demand forecast or scheduled only at fixed intervals.

Other Embodiments

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the described embodiment generates a schedule that reflects all outstanding customer orders and all inventory which is then analyzed to produce an work schedule and a material delivery schedule. Other embodiments may use only a subset of customer orders and inventory to generate one or more schedules. Such variations are contemplated within the scope of the invention.

The above-described embodiments describe scheduling blocks as occurring at fixed intervals such as two hours. The scope of the invention includes scheduling blocks at variable intervals that are determined during the manufacturing process.

The above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein.

Consequently, the invention is intended to be limited only by the spirit and scope of the appended claims, giving full cognizance to equivalents in all respects.

What is claimed is:

1. A method for scheduling production of at least one item on at least one manufacturing line based upon customer orders and availability of materials used for the manufacture of the at least one item, said method comprising the steps of:
    (a) receiving at least one customer order for at least one item, the step of receiving the at least one customer order being performed by a work-in-progress (WIP) tracking and control module executing on a computer system;
    (b) storing the at least one customer order for the at least one item as WIP data in a WIP data memory of the computer system;
    (c) developing a list of materials and working schedules required to manufacture the at least one item, the steps of developing a list of materials and working schedules being performed by a scheduling module from information comprising:
        (1) the WIP data stored in the WIP data memory,
        (2) available external inventory from an external communications module coupled to an external visibility interface module coupled to an external inventory memory,
        (3) available in-house inventory from an inventory manager module coupled to an in-house inventory memory,
        (4) in-transit inventory from an in-transit inventory memory coupled to a delivery scheduling module and
        (5) scheduling data from a scheduling data memory, all memories and modules executing on the computer system;
    (d) generating a work schedule for manufacturing the at least one item on the at least one manufacturing line, the step of generating the work schedule being performed by the work-in-progress (WIP) tracking and control module executing on the computer system;
    (e) receiving truck arrival information from the at least one manufacturing line and generating a truck arrival schedule to the delivery scheduling module, the steps of receiving the truck arrival information and generating the truck arrival schedule being performed by a truck scheduling module executing on the computer system;

(f) generating in-house and external material requests, the steps of generating the in-house and external material requests being performed by the delivery scheduling module executing on the computer system;

(g) repeating steps (a)-(f) until the at least one item has been manufactured;

developing a plurality of material requirements from the list of materials generated by the scheduling module, wherein each material requirement of the plurality of material requirements comprises an identified material and a material need-by time;

identifying a next truck scheduled for delivery to the at least one manufacturing line, the next truck originating at a material source, the step of identifying the next truck being performed by a module executing on the computer system;

determining whether a following truck scheduled for delivery to the at least one manufacturing line after the next truck has a material delivery time before the material need-by time of the material requirement, the step of determining being performed by a module executing on a computer system, and when the following truck has a material delivery time before the material need-by time, delaying processing of the material requirement, and when the following truck has a material delivery time after the material need-by time, determining whether a later opportunity to request the identified material exists, and when a later opportunity exists, delaying requesting the identified material and scheduling a delivery of the identified material, and when a later opportunity does not exist, requesting the identified material by adding the identified material to a material request for the next truck and scheduling a delivery of the identified material from the material source to the at least one manufacturing line on the next truck.

2. A method for scheduling production of at least one item on at least one manufacturing line based upon customer orders and availability of materials used for the manufacture of the at least one item, said method comprising the steps of:

(a) receiving at least one customer order for at least one item, the step of receiving the at least one customer order being performed by a work-in-progress (WIP) tracking and control module executing on a computer system;

(b) storing the at least one customer order for the at least one item as WIP data in a WIP data memory of the computer system;

(c) developing a list of materials and working schedules required to manufacture the at least one item, the steps of developing a list of materials and working schedules being performed by a scheduling module from information comprising:

(1) the WIP data stored in the WIP data memory, (2) available external inventory from an external communications module coupled to an external visibility interface module coupled to an external inventory memory, (3) available in-house inventory from an inventory manager module coupled to an in-house inventory memory, (4) in-transit inventory from an in-transit inventory memory coupled to a delivery scheduling module and (5) scheduling data from a scheduling data memory, all memories and modules executing on the computer system;

(d) generating a work schedule for manufacturing the at least one item on the at least one manufacturing line, the step of generating the work schedule being performed by the work-in-progress (WIP) tracking and control module executing on the computer system;

(e) receiving truck arrival information from the at least one manufacturing line and generating a truck arrival schedule to the delivery scheduling module, the steps of receiving the truck arrival information and generating the truck arrival schedule being performed by a truck scheduling module executing on the computer system;

(f) generating in-house and external material requests, the steps of generating the in-house and external material requests being performed by the delivery scheduling module executing on the computer system;

(g) repeating steps (a)-(f) until the at least one item has been manufactured;

obtaining a material requirement for an operation of at least one operation on the manufacturing line, the material requirement comprising an identified material and a material need-by time, the step of obtaining the material requirement being performed by a module executing on the computer system;

identifying a next truck scheduled for delivery to the operation, the next truck originating at a material source, the step of identifying the next truck being performed by a module executing on the computer system;

determining whether a following truck scheduled for delivery to the operation after the next truck has a material delivery time before the material need-by time of the material requirement, the step of determining being performed by a module executing on a computer system, and when the following truck has a material delivery time before the material need-by time, delaying processing of the material requirement, and when the following truck has a material delivery time after the material need-by time, determining whether a later opportunity to request the identified material exists, and when a later opportunity exists, delaying requesting the identified material and scheduling a delivery of the identified material, and when a later opportunity does not exist, requesting the identified material by adding the identified material to a material request for the next truck and scheduling a delivery of the identified material from the material source to the operation on the next truck.

* * * * *

UNITED STATES PATENT AND TRADEMARK OFFICE
CERTIFICATE OF CORRECTION

| | |
|---|---|
| PATENT NO. | : 7,577,577 B2 |
| APPLICATION NO. | : 09/774396 |
| DATED | : August 18, 2009 |
| INVENTOR(S) | : Lyon et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 970 days.

Signed and Sealed this

Fourteenth Day of December, 2010

David J. Kappos
*Director of the United States Patent and Trademark Office*